US011230648B2

(12) United States Patent
Gacek et al.

(10) Patent No.: US 11,230,648 B2
(45) Date of Patent: Jan. 25, 2022

(54) POLYMER COMPOSITIONS, MATERIALS, AND METHODS OF MAKING

(71) Applicant: SAINT-GOBAIN PERFORMANCE PLASTICS CORPORATION, Solon, OH (US)

(72) Inventors: Matthew Gacek, San Diego, CA (US); Jeffrey H. Peet, Southborough, MA (US); Florence Py, Canohès (FR)

(73) Assignee: SAINT-GOBAIN PERFORMANCE PLASTICS CORPORATION, Solon, OH (US)

( * ) Notice: Subject to any disclaimer, the term of this patent is extended or adjusted under 35 U.S.C. 154(b) by 19 days.

(21) Appl. No.: 16/343,278

(22) PCT Filed: Oct. 23, 2017

(86) PCT No.: PCT/US2017/057890
§ 371 (c)(1),
(2) Date: Apr. 18, 2019

(87) PCT Pub. No.: WO2018/081006
PCT Pub. Date: May 3, 2018

(65) Prior Publication Data
US 2020/0123406 A1    Apr. 23, 2020

Related U.S. Application Data

(60) Provisional application No. 62/411,800, filed on Oct. 24, 2016.

(51) Int. Cl.
C08L 83/04         (2006.01)
C09D 127/18        (2006.01)
(Continued)

(52) U.S. Cl.
CPC .............. *C09D 127/18* (2013.01); *C08J 3/005* (2013.01); *C08L 27/18* (2013.01); *C08J 2327/18* (2013.01);
(Continued)

(58) Field of Classification Search
None
See application file for complete search history.

(56) References Cited

U.S. PATENT DOCUMENTS 2,681,324 A    6/1954   Hochberg
2,820,752 A    1/1958   Heller
(Continued)

FOREIGN PATENT DOCUMENTS

CA         998300 A      11/1984
CN        1565333 A       1/2005
(Continued)

OTHER PUBLICATIONS

Datasheet for DuPont Teflon PTFE TE-3859, 4 pages, 2005. (Year: 2005).*

(Continued)

*Primary Examiner* — Robert S Loewe
(74) *Attorney, Agent, or Firm* — Abel Schillinger, LLP; Cui Suk Kim

(57) ABSTRACT

A polymer material including a fluorinated component and a silicone component can exhibit improved performance, such as increased thermal stability. An article can include the polymer material. For example, a coated fabric including the polymer material can exhibit improved dielectric strength. A composition for forming the polymer material can include a dispersion comprising a fluorinated component and an emulsion comprising a reactive silicone component. In an embodiment, a single pass film formed from the composition can have an increased critical crack thickness. A method (Continued)

can include forming a polymer material from the composition.

14 Claims, 10 Drawing Sheets

(51) Int. Cl.
*C08J 3/00* (2006.01)
*C08L 27/18* (2006.01)

(52) U.S. Cl.
CPC ....... *C08J 2483/04* (2013.01); *C08L 2201/54* (2013.01); *C08L 2203/16* (2013.01)

(56) References Cited

U.S. PATENT DOCUMENTS

| | | |
|---|---|---|
| 2,945,831 A | 7/1960 | Evans et al. |
| 3,765,932 A | 10/1973 | Kokubo et al. |
| 3,842,386 A | 10/1974 | Suska |
| 3,931,084 A | 1/1976 | Buckley et al. |
| 4,123,401 A | 10/1978 | Berghmans et al. |
| 4,210,697 A | 7/1980 | Adiletta |
| 4,230,523 A | 10/1980 | Gajda |
| 4,298,416 A | 11/1981 | Casson et al. |
| 4,339,553 A | 7/1982 | Yoshimura et al. |
| 4,347,268 A | 8/1982 | Close |
| 4,370,376 A | 1/1983 | Gangal et al. |
| 4,391,930 A | 7/1983 | Olson |
| 4,503,179 A | 3/1985 | Yoshimura et al. |
| 4,504,528 A | 3/1985 | Zucker et al. |
| 4,555,543 A | 11/1985 | Effenberger et al. |
| 4,606,951 A | 8/1986 | Wakasugi et al. |
| 4,610,918 A | 9/1986 | Effenberger et al. |
| 4,654,235 A | 3/1987 | Effenberger et al. |
| 4,680,331 A | 7/1987 | Suzuki et al. |
| 4,770,927 A | 9/1988 | Effenberger et al. |
| 4,962,136 A | 10/1990 | Peters |
| 5,126,192 A | 6/1992 | Chellis et al. |
| 5,182,151 A | 1/1993 | Furuta et al. |
| 5,182,173 A | 1/1993 | Swei |
| 5,194,335 A | 3/1993 | Effenberger et al. |
| 5,230,937 A | 7/1993 | Effenberger et al. |
| 5,368,924 A | 11/1994 | Merrill, Jr. et al. |
| 5,434,001 A | 7/1995 | Yamada et al. |
| 5,508,084 A | 4/1996 | Reeves et al. |
| 5,693,244 A | 12/1997 | Pragt et al. |
| 5,712,335 A | 1/1998 | Tsuda et al. |
| 5,720,703 A | 2/1998 | Chen et al. |
| 5,880,245 A | 3/1999 | Fujita et al. |
| 5,897,919 A | 4/1999 | Merrill, Jr. et al. |
| 5,931,083 A | 8/1999 | Stanger et al. |
| 6,133,373 A | 10/2000 | Kirochko et al. |
| 6,169,139 B1 | 1/2001 | Van Cleeff |
| 6,379,806 B1 | 4/2002 | Takamura et al. |
| 6,514,892 B1 | 2/2003 | Kasai et al. |
| 6,664,336 B1 | 12/2003 | Tomihashi et al. |
| 6,720,381 B1 | 4/2004 | Tomihashi et al. |
| 6,764,763 B1 | 7/2004 | Tomihashi et al. |
| 6,794,550 B2 | 9/2004 | Hintzer et al. |
| 6,930,063 B2 | 8/2005 | Keese |
| 7,238,102 B2 | 7/2007 | Goupil, Jr. et al. |
| 7,247,673 B2 | 7/2007 | Pinter et al. |
| 7,271,209 B2 | 9/2007 | Li et al. |
| 7,407,899 B2 | 8/2008 | Wang et al. |
| 7,485,588 B2 | 2/2009 | Wang et al. |
| 7,547,745 B2 | 6/2009 | Valette |
| 7,619,039 B2 | 11/2009 | Jones et al. |
| 7,803,855 B2 | 9/2010 | Kintzley et al. |
| 8,673,449 B2 | 3/2014 | Woerner et al. |
| 8,969,222 B2 | 3/2015 | Keese et al. |
| 9,314,132 B2 | 4/2016 | Woerner et al. |
| 2002/0123282 A1 | 9/2002 | Mccarthy et al. |
| 2002/0193500 A1 | 12/2002 | Hintzer et al. |
| 2003/0026951 A1 | 2/2003 | Okuyama |
| 2003/0092825 A1 | 5/2003 | Visca et al. |
| 2004/0214944 A1 | 10/2004 | Tomihashi et al. |
| 2004/0229043 A1 | 11/2004 | Spohn et al. |
| 2004/0242753 A1 | 12/2004 | Tomihashi et al. |
| 2005/0001351 A1 | 1/2005 | Yoshida |
| 2005/0153610 A1 | 7/2005 | McCarthy |
| 2005/0159062 A1* | 7/2005 | Machino ............... D04H 1/48 442/320 |
| 2005/0282023 A1 | 12/2005 | Comeaux et al. |
| 2006/0084742 A1 | 4/2006 | Ishida et al. |
| 2006/0084743 A1 | 4/2006 | Chen |
| 2006/0102013 A1 | 5/2006 | Spohn |
| 2006/0122325 A1 | 6/2006 | Wenz et al. |
| 2006/0264537 A1* | 11/2006 | Jones ................ C09D 151/003 523/201 |
| 2007/0178133 A1 | 8/2007 | Rolland |
| 2007/0190336 A1 | 8/2007 | Patel et al. |
| 2007/0207273 A1 | 9/2007 | English et al. |
| 2008/0241494 A1 | 10/2008 | Ardiff et al. |
| 2009/0042038 A1 | 2/2009 | Okuya et al. |
| 2009/0049996 A1 | 2/2009 | Calzada et al. |
| 2010/0159223 A1 | 6/2010 | Keese et al. |
| 2011/0020653 A1 | 1/2011 | Kearns et al. |
| 2011/0189472 A1 | 8/2011 | Roberts |
| 2013/0190444 A1* | 7/2013 | Hirono .................. C08L 33/16 524/520 |
| 2013/0231020 A1 | 9/2013 | Liao et al. |
| 2015/0299943 A1 | 10/2015 | Keese et al. |

FOREIGN PATENT DOCUMENTS

| | | |
|---|---|---|
| CN | 101056568 A | 10/2007 |
| CN | 101245209 A | 8/2008 |
| CN | 102002201 B | 9/2012 |
| EP | 0012955 A | 7/1980 |
| EP | 125955 A2 | 11/1984 |
| EP | 164278 A1 | 12/1985 |
| EP | 0218995 A2 | 4/1987 |
| EP | 0955211 A2 | 11/1999 |
| EP | 0969055 A1 | 1/2000 |
| EP | 1416024 A1 | 5/2004 |
| EP | 1261480 B1 | 10/2004 |
| GB | 997096 A | 6/1965 |
| GB | 1415374 A | 11/1975 |
| GB | 1557230 A | 12/1979 |
| JP | S48-17545 B1 | 5/1973 |
| JP | S48-085897 A | 11/1973 |
| JP | S59005225 B2 | 2/1984 |
| JP | S60-046244 A | 3/1985 |
| JP | S60149452 A | 8/1985 |
| JP | S6134032 A | 2/1986 |
| JP | H04009141 B2 | 2/1992 |
| JP | H04292673 A | 10/1992 |
| JP | H04-506548 A | 11/1992 |
| JP | H04371116 A | 12/1992 |
| JP | H05039451 A | 2/1993 |
| JP | H05123246 A | 5/1993 |
| JP | H05-177768 A | 7/1993 |
| JP | H05059827 B2 | 9/1993 |
| JP | H06211981 A | 8/1994 |
| JP | H07011581 A | 1/1995 |
| JP | H0866314 A | 3/1996 |
| JP | H08120211 A | 5/1996 |
| JP | H09507153 A | 7/1997 |
| JP | H107973 A | 1/1998 |
| JP | H10316820 A | 12/1998 |
| JP | 2000053834 A | 2/2000 |
| JP | 2001315248 A | 11/2001 |
| JP | 2002086616 A | 3/2002 |
| JP | 2004033393 A | 2/2004 |
| JP | 2005087526 A | 4/2005 |
| JP | 2006117900 A | 5/2006 |
| JP | 2009131537 A | 6/2009 |
| JP | 2010522657 A | 7/2010 |
| JP | 2012511454 A | 5/2012 |
| KR | 1020070051307 A | 5/2007 |
| WO | 200022041 A1 | 4/1961 |
| WO | 9015898 A1 | 12/1990 |
| WO | 03006565 A1 | 1/2003 |

(56) References Cited

FOREIGN PATENT DOCUMENTS

| WO | 3011991 | A1 | 2/2003 |
| WO | 2007140091 | A1 | 12/2007 |
| WO | 2010075210 | A2 | 7/2010 |
| WO | 2011011701 | A2 | 1/2011 |
| WO | 2018081006 | A1 | 5/2018 |

OTHER PUBLICATIONS

Technical datasheet for Teflon PTFE DISP 30 Fluoropolymer Dispersion, 4 pages. (Year: 2020).*
Technical datasheet for Teflon PTFE DISP 30 Fluoroplastic Dispersion, 2 pages, 2015. (Year: 2015).*
Partial European Search Report for EP Application No. EP17864932.3, dated Mar. 13, 2020, 10 pages.
International Search report and Written Opinion for PCT/US2017/057890, dated Feb. 12, 2018, 13 pages.
International Search Report from PCT/US2010/043076 dated Apr. 22, 2012, 1 pg.
Steiner et al., Super-hydrophobic surfaces made from Teflon, Soft Matter, Dec. 12, 2006, vol. 3, pp. 426-429.
Taconic, Taconic TFE-Glass Fabric, 2005, pp. 1-3, http://www.4taconic.com/en/tfe-glass.php.
International Search Report from PCT App. No. PCT/US2010/061119, dated Aug. 23, 2011, 1 pg.
The Extended European Search Report for EP Application No./Patent No. 10838316.7/2512307, PCT/2010061119, received from the European Patent Office, dated Apr. 18, 2013, 7 pages.
Pieter Van Der Wal et al., "Super hydrophobic surfaces made from Teflon," The Royal Society of Chemistry, 2007, Soft Matter, R S C Publications, GB, vol. 3, dated Jan. 1, 2007, pp. 426-429.
NovaSmooth Fiberglass Fabric, Dielectric Solutions: the Fabric of Innovation, Dielectric Solutions, LLC, Teflon (registered trademark of Dupont), 1 page.
The International Search Report and the Written Opinion received from the International Searching Authority (ISA/KR) for International Application No. PCT/US2009/068730, dated Aug. 13, 2010, 12 pages.

* cited by examiner

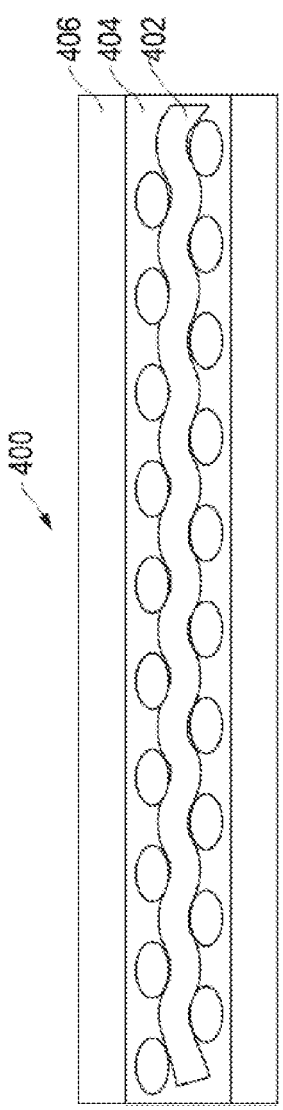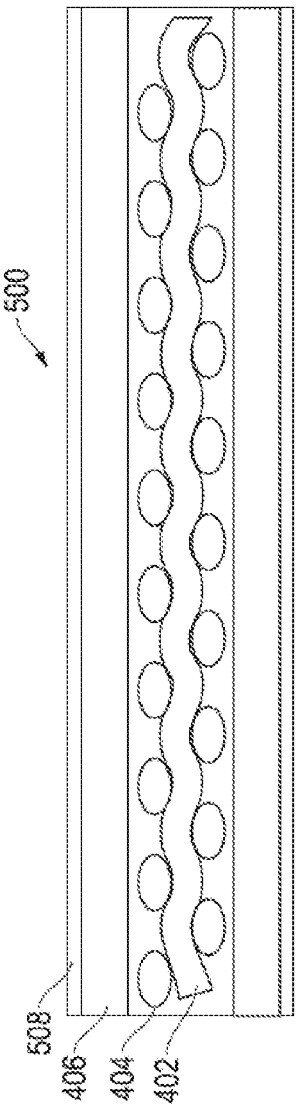
FIG. 5
FIG. 6

POLYMER COMPOSITIONS, MATERIALS, AND METHODS OF MAKING

CROSS-REFERENCE TO RELATED APPLICATIONS

This application is a National Stage entry under 35 U.S.C. § 371 of International Application No. PCT/US2017/057890, filed Oct. 23, 2017, entitled "POLYMER COMPOSITIONS, MATERIALS, AND METHODS OF MAKING," by Matthew GACEK et al., which claims priority to U.S. Provisional Patent Application No. 62/411,800, filed Oct. 24, 2016, entitled "POLYMER COMPOSITIONS, MATERIALS, AND METHODS OF MAKING," by Matthew GACEK et al, which applications are assigned to the current assignee hereof and incorporated herein by reference in their entireties.

TECHNICAL FIELD

The present disclosure relates to polymer sheets and coated fabrics.

BACKGROUND ART

Polymer sheets and coated fabrics are employed in a variety of industries. The polymer sheets and coated fabrics can be made from at least on pass of a colloidal mixture. The manufacturing process can include, for example, drying or baking steps. The polymer sheets and coated fabrics can have a critical crack thickness ("CCT") at which undesired cracks appear during the drying or baking steps. A low CCT can result in an increased number of processing steps.

BRIEF DESCRIPTION OF THE DRAWINGS

Embodiments are illustrated by way of example and are not limited in the accompanying figures.

FIGS. 5 and 6 include illustrations of coated fabrics according to certain embodiments described herein.

Figure 1:
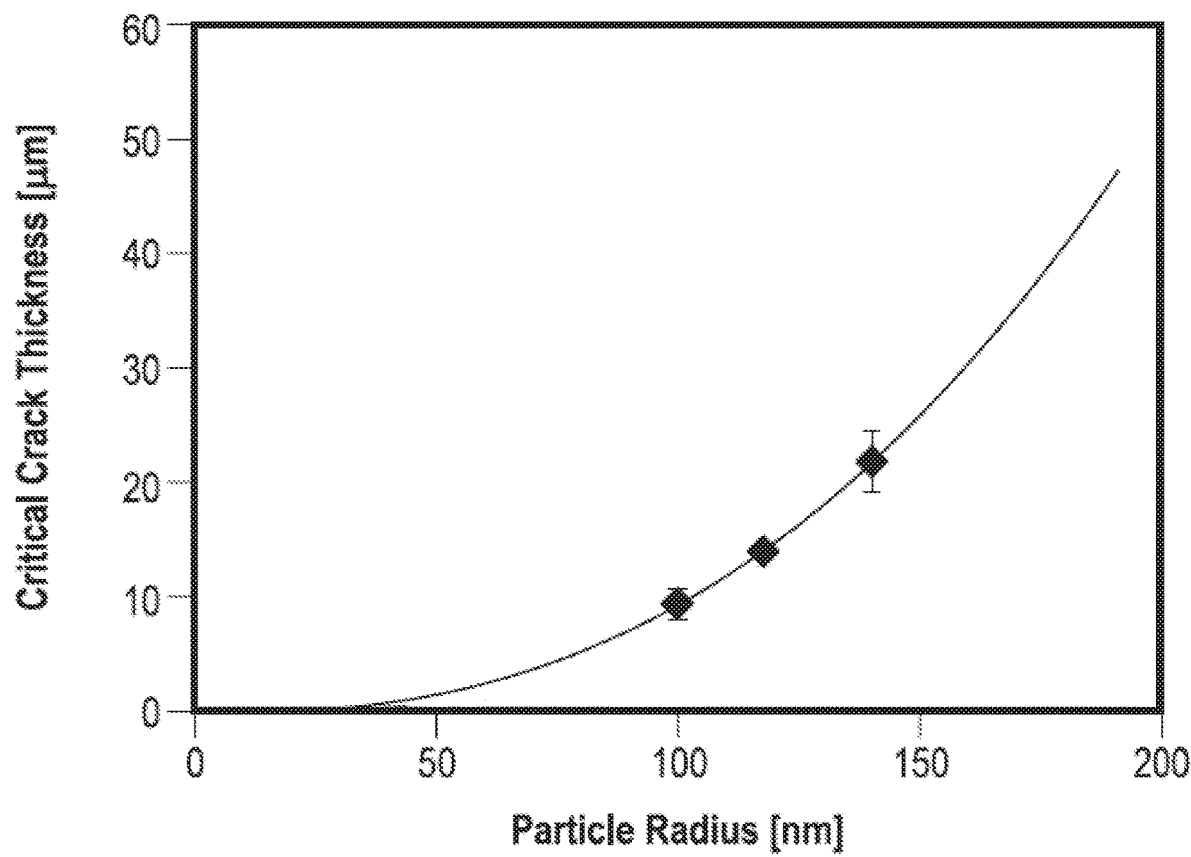
FIG. 1 includes a graph depicting an expected critical crack thickness of polytetrafluoroethylene.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE PREFERRED EMBODIMENTS

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other embodiments can be used based on the teachings as disclosed in this application.

As used herein, the term "dispersion" refers to a solid substance suspended in a fluid matrix, and the term "emulsion" refers to a liquid substance suspended in a fluid matrix. The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the polymer, sheet material, and fabric arts.

Described herein is a polymer material including a fluorinated component. The polymer material can exhibit improved performance over conventional fluoropolymer materials. For example, conventional fluoropolymer materials can include large voids between fluoropolymer particles. Without being bound by theory, it is believed that these large voids can degrade performance in fluoropolymer materials, for example, by exhibiting a low Critical Crack Thickness ("CCT"), the thickness at which cracks begin to appear in a single pass of the polymer material.

However, the polymer material described herein can include a silicone component derived from a reactive silicone that can permeate and conform to such voids between fluoropolymer particles. Conventional polymer materials, and even fluoropolymer materials formed from compositions including a silicone component derived from a pre-cured silicone, do not exhibit the level of permeation of and conforming to such voids between fluoropolymer particles exhibited by the polymer material described herein. The concepts are better understood in view of the embodiments described below that illustrate and do not limit the scope of the specification.

The fluoropolymer component of the polymer material described herein can include a fluoropolymer or even a perfluoropolymer. For example, the fluoropolymer component can include a polytetrafluoroethylene (PTFE), a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), a polychlorotrifluoroethylene (PCTFE), a poly vinylidene fluoride (PVDF), a terpolymer including tetrafluoroethylene, hexafluoropropylene, and vinylidenefluoride (THV), or any blend or any alloy thereof.

The silicone component of the polymer material described herein can include a silicone polymer. For example, the silicone polymer can include a siloxane, such as an alkylsiloxane, or even a polydimethyl siloxane.

In a particular embodiment, the silicone component can be derived from a reactive silicone. As used herein, the term "reactive silicone" refers to a silicone polymer having one or more functional terminal groups suitable for crosslinking. In an embodiment, the functional terminal groups can include a hydroxyl, an alkysiloxane, a vinyl, an amino, a methoxy, a methacryl, a polyether, a silanol, a carboxylic anhydride, or any combination thereof. The silicone polymer can have additional groups in the polymer backbone. The additional groups can include an organo-functional group, a phenyl, a methoxy, an ethoxy, a mercapto, a carboxyl, an acrylate, an isocyanate, an acid anhydride, a polyether, an aralkyl, a fluoroalkyl, or any combination thereof. Further, as used herein, the term "derived from a reactive silicone" refers to a silicone component resulting from a composition that includes a fluoropolymer dispersion and a silicone emulsion, and the silicone in the silicone emulsion includes a reactive silicone. This is in contrast to a silicone component derived from a pre-cured silicone, which refers to a silicone component resulting from a composition that includes a fluoropolymer dispersion and a silicone dispersion, and the silicone in the silicone dispersion includes pre-cured silicone particles.

The amount of fluorinated component in the polymer material can be equal to or greater than the amount of silicone component in the polymer material. In an embodiment, the fluoropolymer can be present in the polymer material in an amount of at least 55 wt %, or at least 65 wt %, or at least 75 wt %, based on a total weight of the polymer material. In an embodiment, the fluoropolymer can be present in the polymer material an amount of at most 94 wt %, or at most 91 wt %, or at most 87.5 wt %, or at most 84 wt %, or at most 80 wt %, based on a total weight of the polymer material. Moreover, the fluoropolymer can be present in the polymer material in an amount in a range of any of the above values, such as 55 to 94 wt % or 65 to 80 wt %, based on a total weight of the polymer material.

The silicone component can be present in the polymer material in an amount of at least 6 wt %, or at least 9 wt %, or at least 12.5 wt %, or at least 16 wt %, or at least 20 wt %, based on a total weight of the polymer material. The silicone component can be present in the polymer material in an amount of at most 45 wt %, or at most 35 wt %, or at most 30 wt %, based on a total weight of the polymer material. Moreover, the silicone component can be present in the polymer material in an amount in a range including any of the above values, such as 6 to 45 wt % or 9 to 30 wt %, based on a total weight of the polymer material.

In addition to the fluorinated component and the silicone component, the polymer material can further include rigid particles. The rigid particles can be more rigid than particles of the silicone component. For example, the rigid particles can have a Young's Modulus greater than that of particles of the silicone component. In an embodiment, the rigid particles can have a Young's Modulus of at least 0.01 GPa, or at least 0.05 GPa, or at least 0.1 GPa. In an embodiment, the rigid particle can have a Young's Modulus of at most 1000 GPa, or at most 900 GPa, or at most 800 GPa. In an embodiment, the rigid particles can have a Young's modulus in a range of any of the above values, such as 0.01 to 1000 GPa, or 0.05 to 900 GPa, or 0.1 to 800 GPa. The rigid particles can include nanoparticles. For example, the rigid particles can have a diameter in a range of 5 to 5000 nm or 10 to 150 nm. The rigid particles can include a silica, a fluoropolymer, an alumina, a nanoparticulate silicone, or any combination thereof. If present, the rigid particles can be present in a range of 0.1 to 33 wt %, 0.5 to 25 wt %, or 1 to 10 wt %, based on the total weight of the polymer material.

In addition to the fluorinated component and the silicone component, the polymer material can further include a filler other than the rigid particles described above. In an embodiment, the filler can include a pigment, a surfactant, an antifoam, or any combination thereof. In an embodiment, if present, the filler can be present in the polymer material in an amount of at least 0.1 wt %, or at least 1 wt %, or at least 3 wt %, or at least 5 wt %. In an embodiment, if present, the filler can be present in an amount of at most 40 wt %, or at most 30 wt %, or at most 20 wt %, or at most 10 wt %. In an embodiment, if present, the filler can be present in a range of any of the above values, such as 0.1 to 40 wt % or even 5 to 10 wt %.

The polymer material can exhibit improved thermal stability. Thermal stability can be measured according to the Mass Loss Test where a sample of the polymer material or an article including the polymer material is heated to a given temperature at a rate of 20° C. per minute, and a thermogravimetric analysis (TGA) instrument continuously weighs the sample through the heat cycle. The results of the Mass Loss Test are reported as a percentage difference in the weight of the sample at 380° C. and the weight of the sample after being heated to a given temperature. The percentage is calculated by dividing the weight of the sample after being heated to the given temperature by the weight of the sample at 380° C., multiplying by 100%. In an embodiment, the polymer material has a mass loss of 0 wt % up to at most 8 wt %, or at most 6 wt %, or at most 5 wt % at 450° C., or 0 wt % up to at most 16 wt %, or at most 14 wt %, or at most 12.5 wt % at 500° C., or 0 wt % up to at most 34 wt %, or at most 32 wt %, or at most 30 wt % at 550° C., as measured according to the Mass Loss Test.

A method of making the polymer material can include providing a dispersion including a precursor to the fluorinated component and an emulsion including a precursor to the silicone component; mixing the dispersion and the emulsion to form a composition; and drying the composition to form the polymer material. The method can include coating the composition on a carrier layer prior to drying.

The method can include sintering the polymer material to form a sintered polymer material. In an embodiment, the sintering temperature can be at least 350° C., or at least 360° C., or at least 370° C., or at least 380° C. In an embodiment, the sintered polymer material includes the silicone component. To improve adhesion between layers or passes, one or more layers or passes can be partially sintered to form a semi-cured layer and another layer or pass can be applied to the semi-cured layer prior to sintering the final article.

As discussed above, the emulsion including a precursor to the silicone component can include a reactive silicone. In an embodiment, the precursor to the silicone component is not a pre-cured silicone polymer or a pre-cured silicone elastomer. Pre-cured silicone polymers or elastomers have been used in conventional fluoropolymer sheet materials. However, the inventors have discovered that using a pre-cured silicone can cause prohibitive process issues and the resultant product can have reduced strength. The inventors have developed a composition using the reactive silicone as a precursor to the silicone component that provides unexpected improvements in strength and performance without the drawbacks associated with using a pre-cured silicone as a precursor to the silicone component.

In particular, colloidal coatings have been known to crack at a certain CCT during drying due to the build up of stress that exceeds the strength of the film. Inventors have discovered that certain causes of cracking can be prevented by the addition of fillers that permeate and conform to voids in the fluorinated component. To the extent that these fillers can permeate and conform to the voids, the fillers can add mechanical strength or reduce meniscus production between the fluoropolymer particles defining the voids. Without being bound by theory, the reactive silicone component of the composition described herein is believed to provide improved properties, such as an increased CCT, in part because the reactive silicone component can better conform to the voids in the fluorinated component than, for example, pre-cured silicone particles.

The increased CCT of the polymer material can be illustrated by a single pass film of the polymer material formed from the composition. Further, the CCT of the polymer material can be based on the size of the fluoropolymer particles of the polymer material. For example, as the size of the particles increase, the CCT of the polymer material increases.

The formulation enables a critical crack thickness of the film to be >25% (or 50%) above the expected CCT for a dispersion of PTFE. Commercially available PTFE dispersions have been observed to coat thicker without cracks as the primary particle size increases, as predicted by theory, with an approximate relationship of $H \propto \alpha^{2.5}$, as illustrated in FIG. 1. In an embodiment, a single pass of the polymer material can have a CCT of at least of at least $1.25 \times 10^{-5} \times D^{2.5}$, or at least $1.5 \times 10^{-5} \times D^{2.5}$, or at least $2.0 \times 10^{-5} \times D^{2.5}$, or at least $3.0 \times 10^{-5} \times D^{2.5}$, where D is the average fluoropolymer particle diameter (in nanometers). The CCT is measured according to a Critical Crack Thickness Test, where a film is formed from the composition and evaluated for cracks. The film is formed by providing a heating plate set at 60° C. for drying the film, providing a polyimide film having a width of about 12.7 cm and a thickness of about 25 microns, placing the polyimide substrate onto an ERICHSEN plate, using an adjustable knife to apply the composition to the polyimide film at a given thickness or gradient of thickness, drying at a temperature of 60° C., and evaluating the dried film for cracks using an OLYMPUS SZX16 microscope. The thickness at which the film first shows cracks is the critical crack thickness. A series of films at different thicknesses or a single film having a thickness gradient can be used to determine the thickness at which the cracks begin to appear. Further, to evaluate whether a composition has a CCT at a given thickness, a film of the thickness in question can be formed and evaluated to determine if cracks appear. If cracks are observed, the composition has a CCT of less than or equal to the given thickness. If no cracks are observed, the composition has a CCT of greater than the given thickness.

In an embodiment, the fluoropolymer particles of the fluorinated component can have an average particle diameter, D of at most 400 nm, or at most 380 nm, or at most 360 nm, or at most 300 nm. As the average particle size of the fluoropolymer particles, decreases the CCT tends to increase. Thus, the CCT at 360 nm would be expected to be greater than the CCT 300 nm. In a further embodiment, the fluoropolymer particles can have an average particle diameter, D, of at least 150 nm, or at least 200 nm, or at least 240 nm. Moreover, the fluoropolymer particles can have an average particle diameter, D, in a range of any of the above values, such as 220 to 400 nm or 240 to 360 nm.

For an average particle diameter D in the above ranges, the single pass film can have a CCT of at least 25 microns, or at least 30 microns, or at least 40 microns, or at least 50 microns. In a further embodiment, the CCT can be at most 100 microns, or at most 90 microns, or at most 80 microns, while an embodiment could have a greater CCT.

The polymer material can form all or part of an article. The article can include a single-layer article or a multi-layer article.

Figure 2:
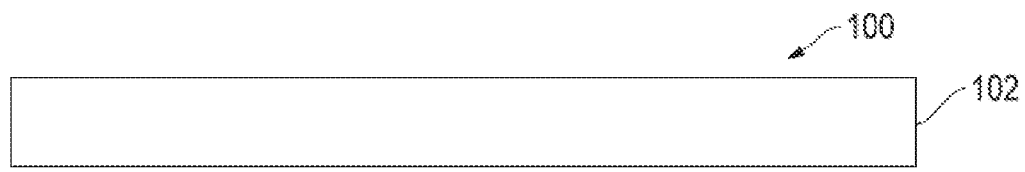
FIG. 2 includes an illustration of a sing-layer article according to certain embodiments described herein.

FIG. 2 includes an illustration of an embodiment including a single-layer article 100. In an embodiment, the single-layer article 100 can only include a layer 102 including the polymer material. For example, the single-layer article 100 can include multiple passes of the polymer material such that none of the passes include a material other than the polymer material. As illustrated in FIG. 2, the single-layer article 100 can be free of a reinforcement layer. The single-layer article 100 can be a finished article or an intermediate article later used, for example, as one layer in a multilayer article.

Figure 3:
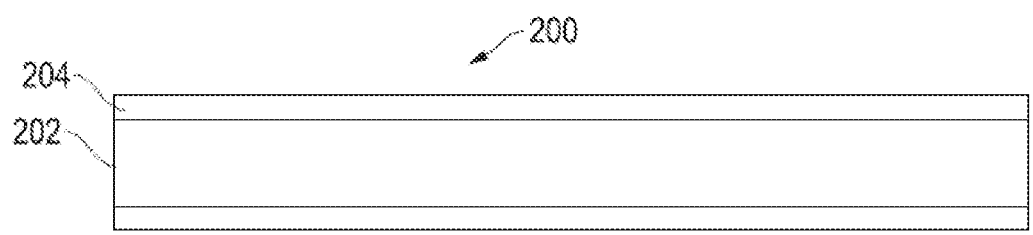
FIGS. 3 and 4 include illustrations of multi-layer articles according to certain embodiments described herein.
Figure 4:
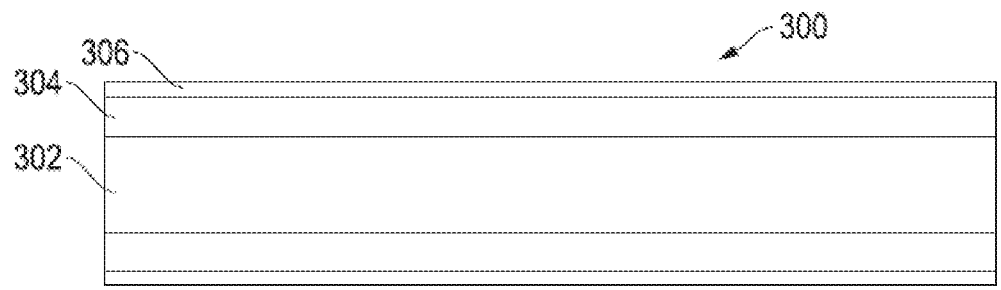

The multi-layer article can include a core layer having opposing major surfaces and an outer layer overlying the core layer. The multi-layer article 200 can include a core layer 202 and a single outer layer 204, as illustrated in FIG. 3. The multi-layer 300 article can include a core layer 302 and multiple outer layers 304 and 306, as illustrated in FIG. 4. While the outer layers are illustrated as being symmetric about the core layer, the outer layers can also be applied in an asymmetric form, wherein one or more of the outer layers can be absent from one of the sides or one or more outer layers can be applied in different thicknesses on different sides. Further, the core layer, an outer layer, or both the core layer and an outer layer can include an additional polymer layer. The additional polymer layer can overlie or underlie a layer including the polymer material described herein. In a particular embodiment, the additional polymer layer can be disposed between the reinforcement layer and the polymer material. In a further particular embodiment, the polymer material can be disposed between the reinforcement layer and the additional polymer layer. The additional polymer layer can include a fluoropolymer. The additional polymer layer can be free of a silicone.

In an embodiment, the core layer can include the polymer material. In a further embodiment, an outer layer can include the polymer material. In a particular embodiment, the core layer or an outer layer can include a reinforcement layer. In a particular embodiment, the polymer material can directly contact the reinforcement layer.

In an embodiment, the reinforcement layer can include a fibrous reinforcement, such as a woven or nonwoven fibrous reinforcement. For example, the fibrous reinforcement can include woven fibrous strands or an intermeshing of random fibrous strands. In an embodiment, the fibrous strands can include an aramid, a fluorinated polymer, a fiberglass, a graphite, a polyimide, a polyphenylene sulfide, a polyketone, a polyester, or any combination thereof. In a particular embodiment, the fibrous strands can be coated with a polymer coating, or cleaned or pretreated with heat. In a particular embodiment, the fibrous strands can be individually coated with a polymeric coating, such as a fluoropolymer coating, for example, PTFE.

In a further embodiment, the reinforcement layer can include a mesh. The mesh can include a ceramic material, a plastic material, a metal material, or any combination thereof.

In a further embodiment, the reinforcement layer can include a support substrate, typically a sheet. The support substrate can include a thermoplastic, such as a thermoplastic polyimide, a polyether-ether ketone, a polyaryl ketone, a polyphenylene sulfide, or a polyetherimide; a thermosetting plastic, such as a polyimide; a plastic coated or laminated textile; a plastic coated or laminated metal foil; a metallized plastic film; a fiberglass; a graphite; a polyaramid; or any combination thereof.

FIGS. 5 and 6 include illustrations of embodiments of an article 400, 500 including a coated fabric. The coated fabric 400, 500 can include a reinforcement layer 402 and the polymer material 404. The polymer material 404 includes the polymer material described herein and the reinforcement layer 402 can include the reinforcement layer described above. As illustrated in FIG. 5, the polymer material penetrates the reinforcement layer. The polymer material can also form an outer layer 406 overlying the reinforcement layer. In a particular embodiment, the reinforcement layer 402 includes a fibrous reinforcement and the polymer material 404 penetrates the fibrous reinforcement. As illustrated in FIG. 6, the coated fabric can include the reinforcement layer 402, the polymer material 404, the outer layer 406 and an outer layer 508 overlying layer 406.

The coated fabric can have an improved dielectric strength as compared to a conventional coated fabric. Such a result is counterintuitive and unexpected, at least because silicone has much lower dielectric strength than the fluoropolymer, yet addition of the reactive silicone to the polymer material improves this property. Without being bound by theory, the inventors believe that the unexpected result may be due to the filling of air voids between the fluoropolymer particles. Improved results can be achieved by incorporating reactive silicones into the composition as they are more able to deform and fill voids between fluoropolymer particles as compared to pre-cured silicone.

In an embodiment, the coated fabric can exhibit improved dielectric strength based on the thickness of the coated fabric. As used herein, dielectric strength can be measured according to ASTM D149 method C using a Beckman dielectric tester and type 3 electrodes. In an embodiment, the coated fabric can have a thickness of at most 7 mil (0.18 mm), or at most 5 mil (0.13 mm), or at most 3 mil (0.08 mm), and a dielectric strength of at least 200 kV/cm (about 508 V/mil), or at least 225 kV/cm (about 572 V/mil), or at least 250 kV/cm (about 635 V/mil). In a further embodiment, the coated fabric can have a thickness of at most 7 mil (0.18 mm), or at most 5 mil (0.13 mm), or at most 3 mil (0.08 mm), and a dielectric strength of at most 550 kV/cm (about 1400 V/mil), or at most 475 kV/cm (about 1200 V/mil), or at most 400 kV/cm (about 1000 V/mil). Moreover, the coated fabric can have a thickness of at most 7 mil (0.18 mm), or at most 5 mil (0.13 mm), or at most 3 mil (0.08 mm), and a dielectric strength in a range within any of the above values, such as in a range of 155 kV/cm to 550 kV/cm or 250 kV/cm to 400 kV/cm.

In an embodiment, the polymer material or coated fabric can have an improved tear strength. For example, a polymer material or coated fabric formed from the composition disclosed herein including a reactive silicone can have an tear strength in the machine direction or cross-machine direction that is at least 15%, or at least 30%, or at least 45% greater than a similar polymer material or coated fabric that is formed from the same composition except with a pre-cured silicone instead of the reactive silicone. The improvement can be at most 100% or greater. The tear strength is measured according to ASTM D751.

In another embodiment, the polymer material according to embodiments described herein, when applied as a coating, can have a particular improved coating adhesion compared to polymer materials not formed according to embodiments described herein as measured using the Coating Adhesion Test. For example, a polymer material formed from the composition disclosed herein including a silicone or a reactive silicone can have a coating adhesion that is at least 15%, or at least 30%, or at least 45% greater than a similar polymer material that is formed from the same composition except with a pre-cured silicone instead of the reactive silicone. The improvement can be at most 200% or greater. The Coating Adhesion Test measures the 5 peak average coating adhesion of the polymer material to another layer and is conducted using the instron test method "adhesion for CF under 20 mil.im_ptf", cross head speed 2"/min, gage length 1". According to the Coating Adhesion Test, twelve 1"×6" cuts of a sample are cut in the warp direction and then tested using a 2000 lb. instron load cell. In another embodiment, the polymer material according to embodiments described herein, when applied as a coating, can have a particular coating adhesion as measured using the Coating Adhesion Test. For example, a polymer material formed from the composition disclosed herein can have a coating adhesion of at least about 1.5 lbs., such as, at least about 1.6 lbs. or at least about 1.7 lbs. or at least about 1.8 lbs., or at least about 1.9 lbs. or at least about 2.0 lbs. or at least about 2.1 lbs. The Coating Adhesion Test measures the 5 peak average coating adhesion of the polymer material another layer and is conducted using the instron test method "adhesion for CF under 20 mil.im_ptf", cross head speed 2"/min, gage length 1". According to the Coating Adhesion Test, twelve 1"×6" cuts of a sample are cut in the warp direction and then tested using a 2000 lb instron load cell.

The following examples are presented to demonstrate the general principles described in the specification. The specification should not be considered as limited to the specific examples presented. All parts and percentages in the examples are by weight unless otherwise indicated.

EXAMPLES

Example 1

The Mass Loss Test was performed on three sample cast films. Sample 1 (X-51 30p) was made from a composition including polytetrafluoroethylene dispersion (PTFE DISP 30 by DuPont) in an amount of 74% by weight of the liquid formulation (constituting 80% by weight PTFE in the dried film) and reactive silicone (X-51-1318 by Shin Etsu) in an amount of 26% by weight of the liquid formulation (constituting 20% by weight silicone in the dried film). Sample 2 (Polon-MF-56-30p) was made from a composition including polytetrafluoroethylene (PTFE DISP 30 by DuPont) in an amount of 72% by weight of the liquid formulation (constituting 80% by weight PTFE in the dried film) and reactive silicone (Polon MF-56 by Shin Etsu) in an amount of 28% by weight of the liquid formulation (constituting 20% by weight silicone in the dried film). Sample 3 was a comparative sample made from a composition including polytetrafluoroethylene (PTFE DISP 30 by DuPont) in an amount of 82% by weight of the liquid formulation (constituting 80% by weight PTFE in the dried film) and a pre-cured silicone (Finish CT 27E by Wacker) in an amount of 18% by weight of the liquid formulation (constituting 20% by weight silicone in the dried film).

Figure 7:
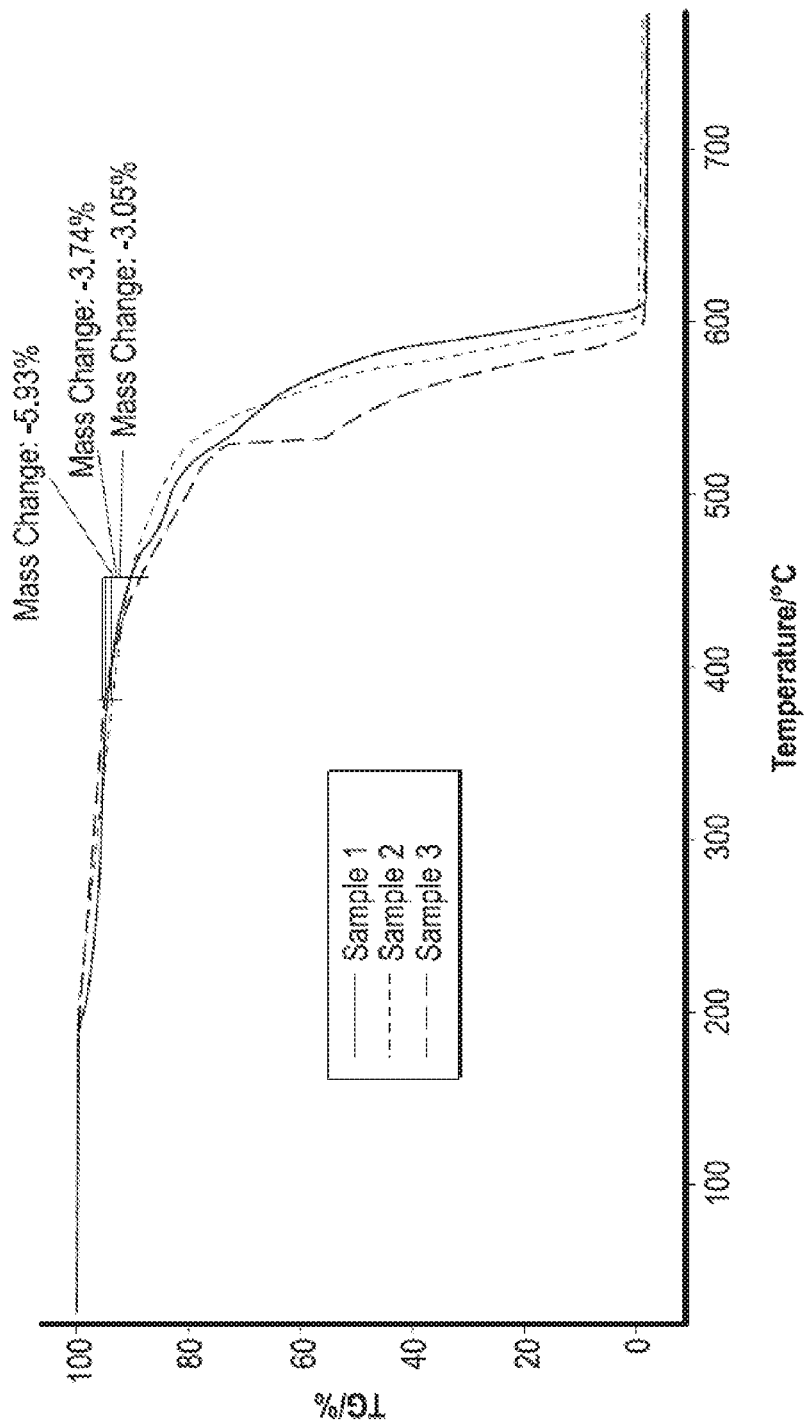
FIGS. 7 and 8 include plots of the results of Mass Loss Tests for Samples 1 to 3 in the Examples section.
Figure 8:
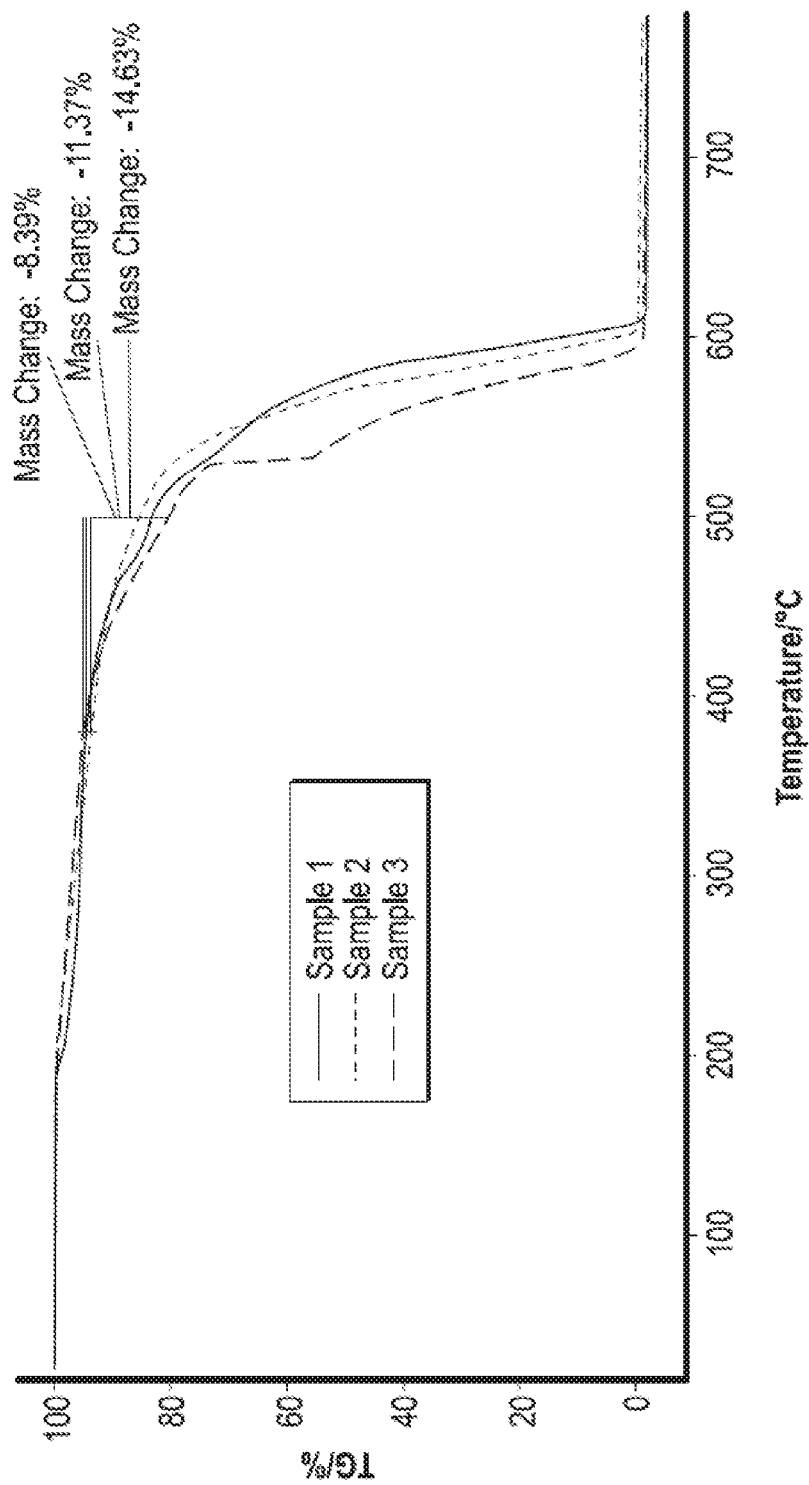

Each sample was heated to a temperature of at least 600° C. at a rate of about 20 degrees Celsius per minute. The results are presented in FIGS. 7 and 8 plotting TG % on the y-axis and the temperature (° C.) on the x-axis and in Tables 1 and 2 below. In FIG. 7, the mass loss was calculated by subtracting the mass at 450° C. from the mass at 380° C. and dividing the difference by the mass at 380° C. In FIG. 8, the mass loss was calculated by subtracting the mass at 500° C. from the mass at 380° C. and dividing the difference by the mass at 380° C.

TABLE 1

Mass Loss at 450° C.

| Sample 1 | Sample 2 | Sample 3 |
|---|---|---|
| 3.74 wt % | 3.05 wt % | 5.93 wt % |

TABLE 2

Mass Loss at 500° C.

| Sample 1 | Sample 2 | Sample 3 |
|---|---|---|
| 11.37 wt % | 8.39 wt % | 14.63 wt % |

As illustrated by the Mass Loss Test, the polymer material described in the specification can have an unexpectedly higher thermal stability (corresponding to a lower mass loss).

Further, when the silicone is present in the top layer of the article, the surface Fourier Transform Infrared Spectroscopy (FTIR) data show more degradation of the pre-cured silicone product at even lower temperatures.

Example 2

Six Samples were tested for dielectric strength, tensile strength, and tear strength. For Sample 4, three passes of polytetrafluoroethylene (PTFE) were coated onto a 1080 style glass fabric; no silicone was used. For Samples 5 to 9, each sample was formed using a composition comprising 30 vol % reactive silicone and 70 vol % polytetrafluoroethylene (PTFE) coated onto a 1080 style glass fabric. The dielectric strength was measured according to ASTM D149 method C using a Beckman dielectric tester and type 3 electrodes. The tensile strength was measured according to ASTM D309 in the machine direction (MD) and the cross machine direction (CD). The tear strength was measured according to ASTM D751 in the machine direction (MD) and the cross machine direction (CD). The results are provided below in Table 3.

TABLE 3

| Sample | Silicone | Thickness [mils] | Weight [oz/yd$^2$] | Dielectric Strength [V/mil] | Tensile Strength (MD) [PLI] | Tensile Strength (CD) [PLI] | Tear Strength (MD) [lbs.] | Tear Strength (CD) [lbs.] |
|---|---|---|---|---|---|---|---|---|
| 4 | None | 3.2 | 4.5 | 400 | 88 | 53 | 3.5 | 2.0 |
| 5 | SEM-630 | 3.0 | 4.2 | 710 | 78 | 50 | 3.8 | 2.8 |
| 6 | X-51-1318 | 3.2 | 3.7 | 968 | 58 | 44 | 3.1 | 2.8 |
| 7 | Polon MF-56 | 3.5 | 4.3 | 793 | 66 | 51 | 3.3 | 2.5 |
| 8 | Polon MF-33A | 3.5 | 4.3 | 830 | 65 | 51 | 5.9 | 3.7 |
| 9 | Coatosil DRI | 3.0 | 3.8 | 498 | 54 | 34 | 2.8 | 1.9 |

SEM-630 is a reactive silicone emulsion available from SILCHEM INC. at Ontario, Canada.
X-51-1318; Polon MF-56; and Polon MF-33A are reactive silicone emulsions available from Shin-Etsu Silicones of America, Inc., at Akron, OH, USA.
COATOSIL DRI is a reactive silicone emulsion available from MOMENTIVE at Waterford, NY, USA.

Example 3

Three samples were evaluated for coefficient of friction and wear rate. Sample 10 was formed from three passes of PTFE coated onto a 1080 style glass fabric. Sample 11 was formed from 2 passes of a composition including 30 vol % silicone and 70 vol % polytetrafluoroethylene (PTFE) onto a 1080 style glass fabric. Sample 12 was formed from a first pass of PTFE and a second pass of a composition including 30 vol % silicone and 70 vol % polytetrafluoroethylene (PTFE) onto a 1080 style glass fabric. The coefficient of friction and wear rate were tested using a NANOVEA tribometer and a ball bearing applying a load to a sample that is rotating on a circular track. The tribometer base is leveled in the horizontal position and the ball was held in a load arm and placed at a height to allow the tribometer arm to be leveled horizontally when resting on the sample to ensure that normal load will be applied vertically. The arm is then balanced with counter weights to ensure that the arm and ball holder initially apply no force on the sample surface. Weights corresponding to the load required for the test were placed on the arm over the ball holder. Through software, the test is then launched and performed under the test parameters and environmental conditions in Tables 3 and 4 below, and the frictional force is recorded over time.

TABLE 4

Test Parameters

| | |
|---|---|
| Load Applied to Sample | 4N |
| Test Duration | 8 min |
| Rotation Speed | 400 rpm |
| Rotation Radius | 5 mm |
| Ball Material | SS440 grade steel |
| Ball Diameter | 6 mm |

TABLE 5

Environmental Conditions

| Lubricant | none |
|---|---|
| Atmosphere | Air |

TABLE 5-continued

Environmental Conditions

| Temperature | 24° C. |
|---|---|
| Humidity | 40% |

Figure 9:
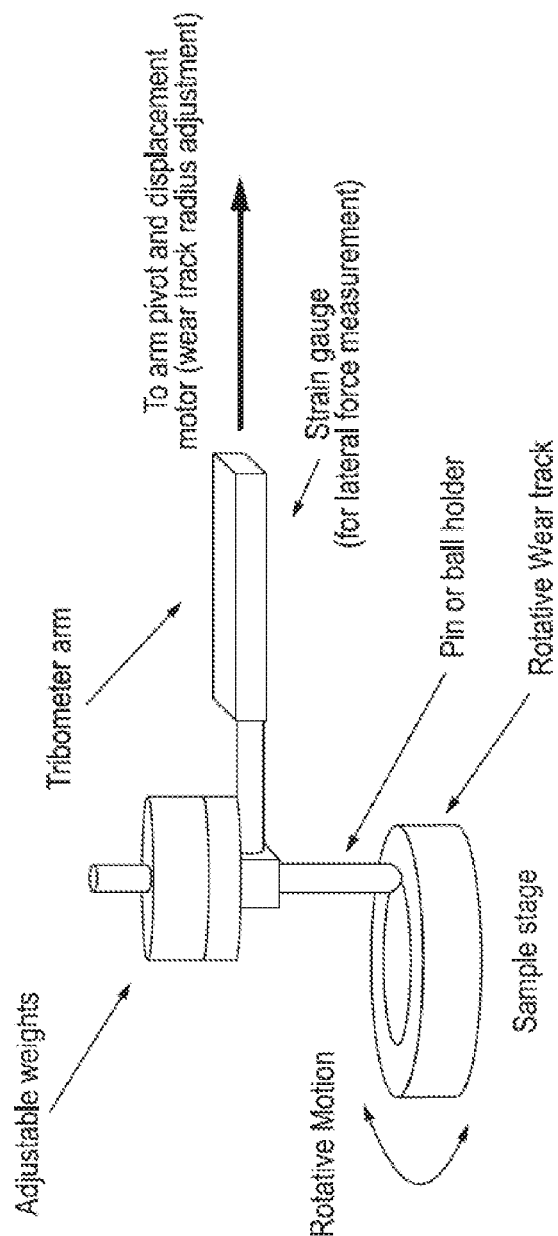
FIG. 9 includes an illustration of a testing apparatus used in the Examples section.

Each sample was mounted on a moving stage and, while the load was applied by the ball on the sample surface, the stage moved the sample in a rotational motion (see FIG. 9, using a ball at the contact point). The resulting frictional forces between the ball and the sample were measured using a strain gage sensor on the arm. The coefficient of friction, COF, was recorded in situ and the volume of material lost was measured to calculate the wear rate of the sample.

Figure 10:
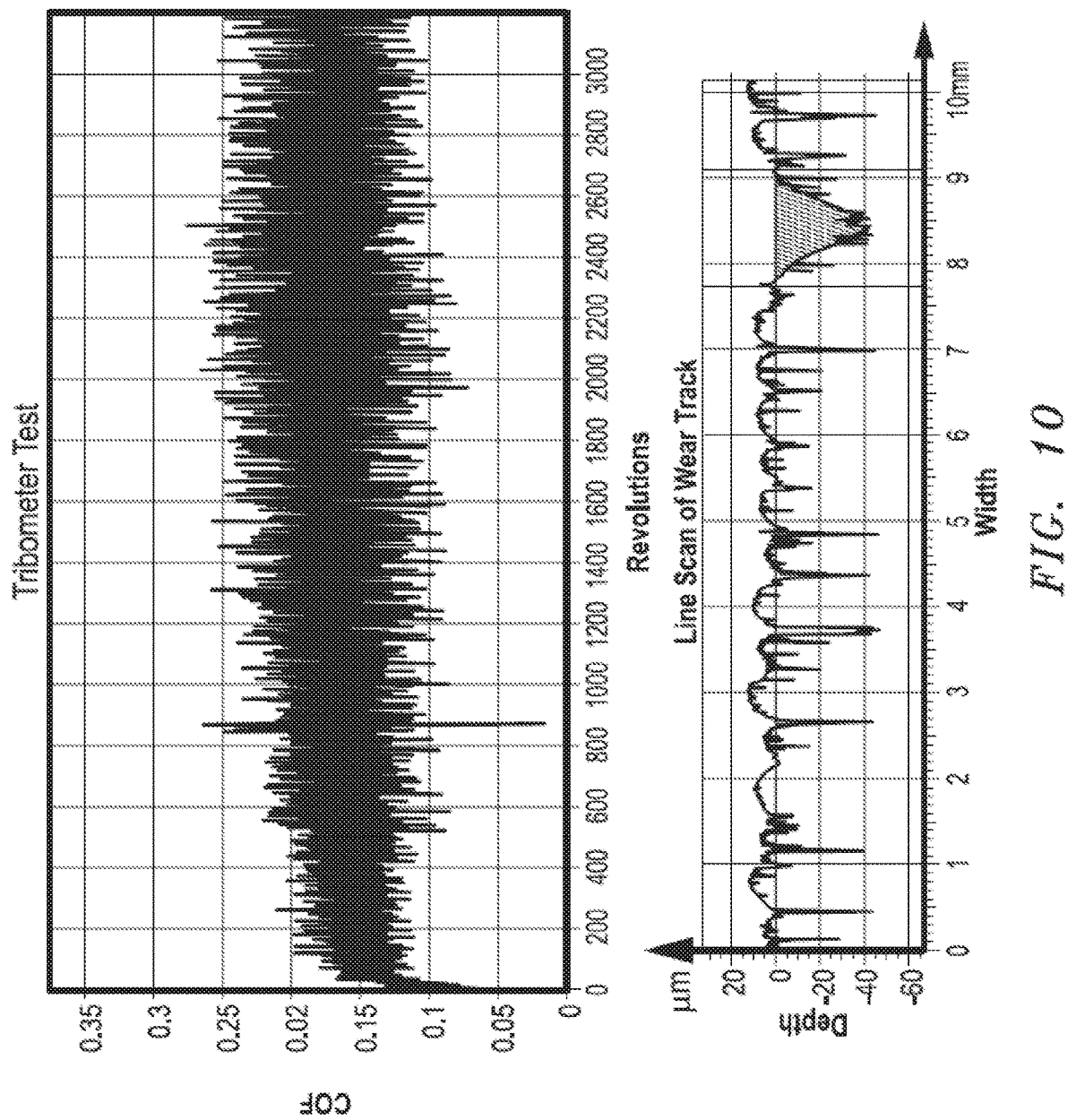
FIGS. 10, 11, and 12 include plots of the results of wear rate tests for Samples 10, 11, and 12 in the Examples section.
Figure 11:
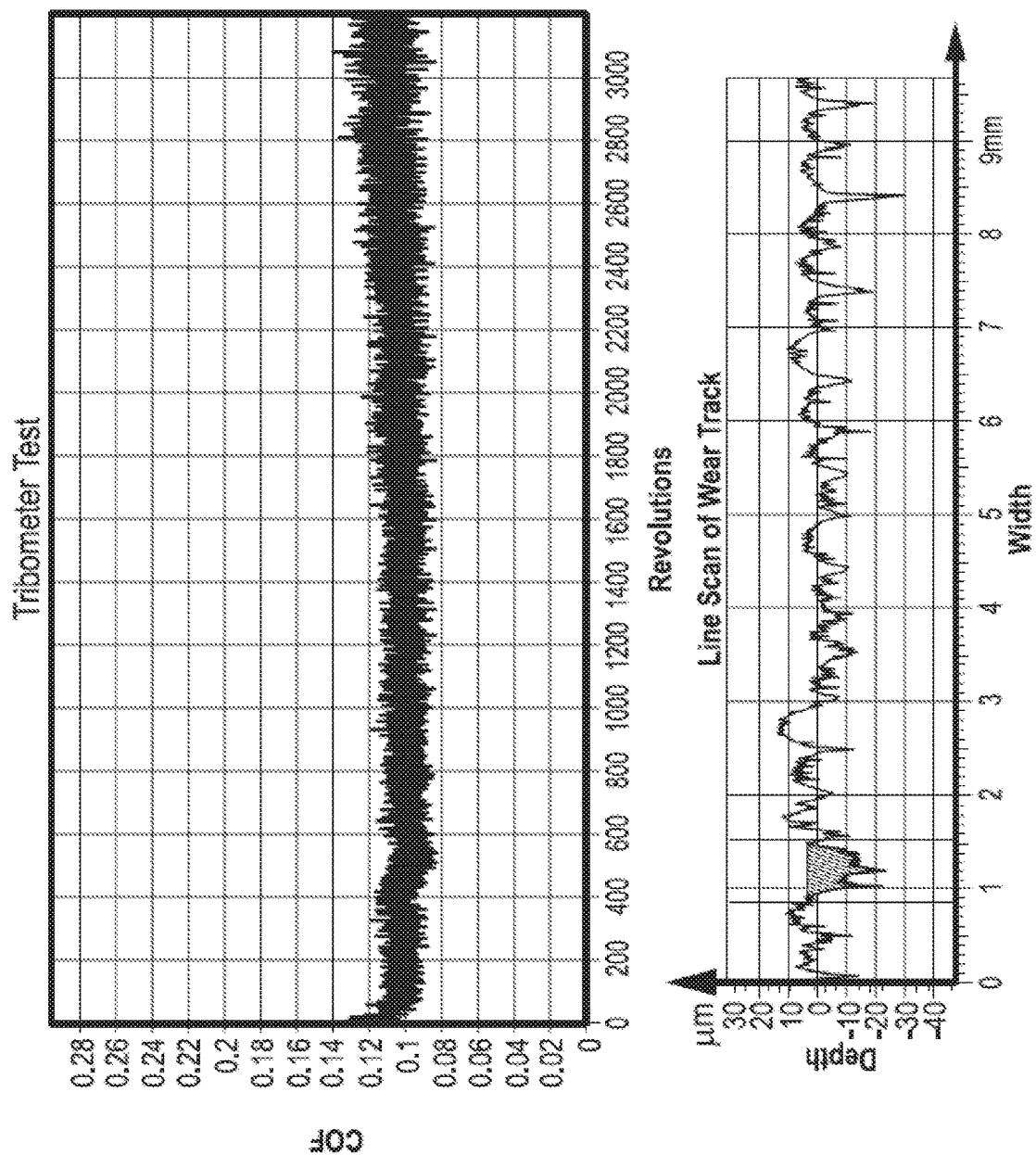
Figure 12:
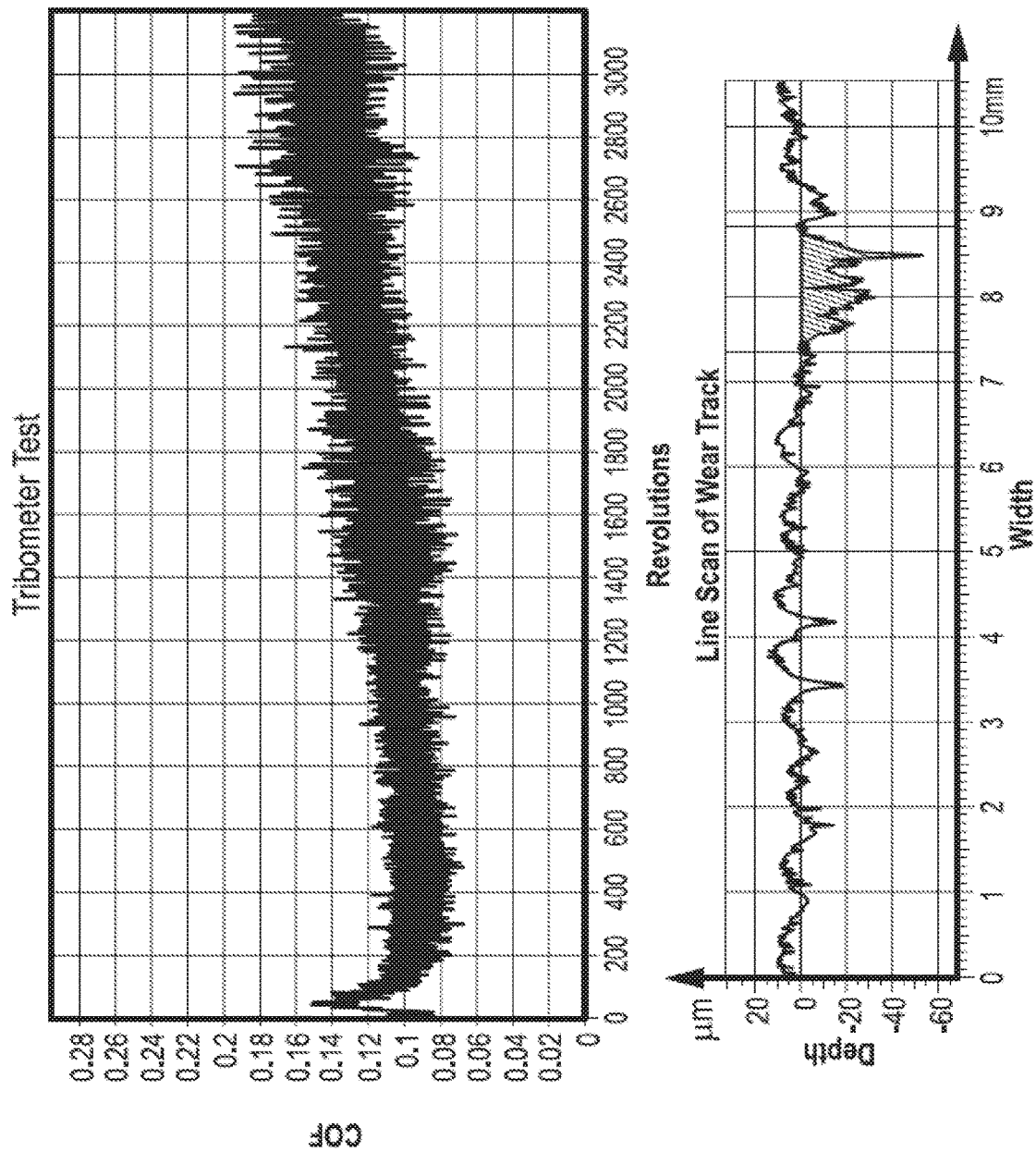

The results of the evaluation are provided in Table 6 and FIGS. 10 to 12. For Sample 10, as illustrated in FIG. 10, the ball bearing wore quickly through the PTFE layers to the glass fabric. For Sample 11, as illustrated in FIG. 11, the coefficient of friction was slightly higher than for PTFE to begin with but dropped with time until it eventually wore through to the glass fabric and slightly drifted back up, indicating an improved wear rate over Sample 10. For Sample 12, as illustrated in FIG. 12, the coefficient of friction started out at about the same as Sample 10, increased slightly as it wore through to the PTFE-silicone blend, and then drifted up once the ball bearing wore through to the glass fabric, also indicating an improved wear rate over Sample 10.

TABLE 6

| Sample | Max COF | Min COF | Avg COF | Wear Rate (mm²/Nm) |
|---|---|---|---|---|
| 10 | 0.276 | 0.019 | 0.164 | 19.27 |
| 11 | 0.155 | 0.082 | 0.103 | 6.06 |
| 12 | 0.194 | 0.068 | 0.112 | 15.43 |

Example 4

Figure 13:
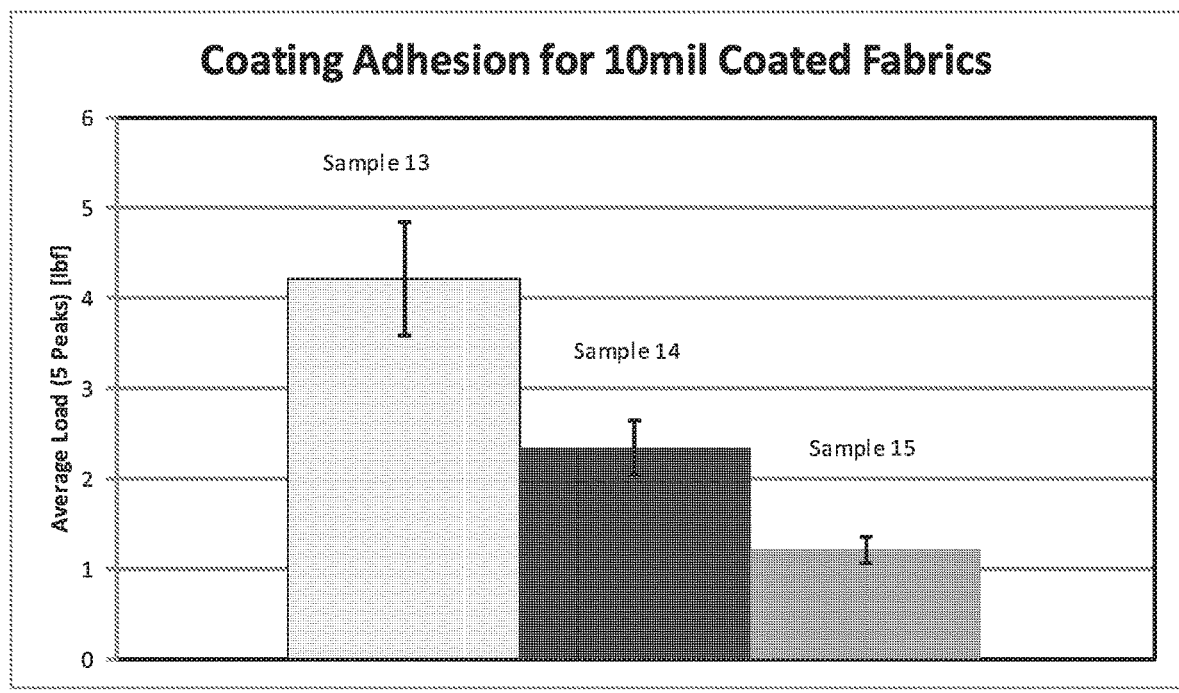
FIG. 13 includes a plot of the results of the coating adhesion test for Samples 13, 14, and 15 in the Examples section.

Three samples were evaluated for coating adhesion strength. Sample 13 was formed by coating one pass of a base polytetrafluoroethylene (PTFE) in a water dispersion onto a glass fabric. Sample 14 was formed by coating one pass of a composition including 20 vol % reactive silicone and 80 vol % of a base polytetrafluoroethylene (PTFE) onto a glass fabric. Sample 15 was formed by coating one pass of a composition including 20 vol % precured silicone and 80 vol % of a base polytetrafluoroethylene (PTFE) onto a glass fabric. The coating adhesion for all three samples was tested using the instron test method "adhesion for CF under 20 mil.im_ptf", cross head speed 2"/min, gage length 1". Twelve 1"×6" cuts of each of samples 13, 14, and 15 were cut in the warp direction and then tested using a 2000 lb instron load cell. The results of the evaluation are provided in Table 7 and FIG. 13.

TABLE 7

| Sample | First Peak [lbf] - Ave | First Peak [lbf] - St. Dev. | Avg. Load 5 Peaks]- Ave | Avg. Load 5 Peaks]- Std. Dev. |
|---|---|---|---|---|
| 13 | 50.24 | 0.834 | 4.93 | 0.63 |
| 14 | 2.46 | 0.37 | 2.34 | 0.31 |
| 15 | 1.47 | 0.25 | 1.21 | 0.14 |

Many different aspects and embodiments are possible. Some of those aspects and embodiments are described below. After reading this specification, skilled artisans will appreciate that those aspects and embodiments are only illustrative and do not limit the scope of the present invention. Embodiments may be in accordance with any one or more of the items as listed below.

Embodiment 1. A composition comprising: a dispersion comprising a fluoropolymer component; and an emulsion comprising a reactive silicone component; wherein the fluoropolymer component comprises a plurality of fluoropolymer particles having an average particle diameter D, and wherein a single pass film formed from the composition has a critical crack thickness CCT of at least $1.25 \times 10^{-5} \times D^{2.5}$, where CCT is in microns and D is in nanometers.

Embodiment 2. The composition of embodiment 1, wherein D is at most 400 nm, or at most 380 nm, or at most 360 nm, or at most 300 nm.

Embodiment 3. The composition of any one of the preceding embodiments, wherein D is at least 150 nm, or at least 200 nm, or at least 240 nm.

Embodiment 4. The composition of any one of the preceding embodiments, wherein D is in a range of 150 to 400 nm, or in a range of 180 to 300 nm.

Embodiment 5. The composition of any one of embodiments 2 to 4, wherein CCT is at least 25 microns, or at least 30 microns, or at least 40 microns, or at least 50 microns.

Embodiment 6. The composition of any one of embodiments 2 to 5, wherein CCT is at most 100 microns, or at most 90 microns, or at most 80 microns.

Embodiment 7. The composition of any one of the preceding embodiments, wherein the reactive silicone component comprises a siloxane.

Embodiment 8. The composition of embodiment 7, wherein the siloxane comprises a polydimethylsiloxane.

Embodiment 9. The composition of any one of the preceding embodiments, wherein the reactive silicone component comprises a silicone polymer having one or more functional terminal groups suitable for crosslinking.

Embodiment 10. The composition of embodiment 9, wherein the one or more functional terminal groups includes a hydroxyl, an alkysiloxane, a vinyl, an amino, a methoxy, a methacryl, a polyether, a silanol, a carboxylic anhydride, or any combination thereof.

Embodiment 11. The composition of any one of the preceding embodiments, wherein the reactive silicone component includes a silicone polymer having groups in a polymer backbone other than a methyl group.

Embodiment 12. The composition of embodiment 11, wherein the groups other than a methyl group include a phenyl, a methoxy, an ethoxy, a mercapto, a carboxyl, an acrylate, an isocyanate, an acid anhydride, a polyether, an aralkyl, a fluoroalkyl, or any combination thereof.

Embodiment 13. The composition of any one of the preceding embodiments, wherein the reactive silicone component of the single pass film is at least 6 wt %, or at least 9 wt %, or at least 12.5 wt %, or at least 16 wt %, or at least 20 wt %, based on a total weight of the single pass film.

Embodiment 14. The composition of any one of the preceding embodiments, wherein the fluorinated component includes a fluoropolymer or even a perfluoropolymer.

Embodiment 15. The composition of embodiment 14, wherein the fluoropolymer includes a polytetrafluoroethylene (PTFE), a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), a polychlorotrifluoroethylene (PCTFE), a poly vinylidene fluoride (PVDF), a terpolymer including tetrafluoroethylene, hexafluoropropylene, and vinylidenefluoride (THV), or any blend or any alloy thereof.

Embodiment 16. The composition of any one of the preceding embodiments, wherein the fluorinated component is present in the single pass film in an amount of at most 94 wt %, or at most 91 wt %, or at most 87.5 wt %, or at most 84 wt %, or at most 80 wt %, based on the total weight of the single pass film.

Embodiment 17. The composition of any one of the preceding embodiments, further comprising a filler selected from the group consisting of a pigment, a surfactant, or an antifoam.

Embodiment 18. The composition of embodiment 17, wherein the filler is present in an amount of at most 40 wt %, or at most 30 wt %, or at most 20 wt %, or at most 10 wt %.

Embodiment 19. The composition of any one of embodiments 17 and 18, wherein the filler is present in an amount of at least 0.1 wt %, or at least 1 wt %, or at least 3 wt %, or at least 5 wt %.

Embodiment 20. A polymer material formed from the composition of any one of the preceding embodiments.

Embodiment 21. A polymer material comprising a fluorinated component and a silicone component, wherein the polymer material has a mass loss of at most 5 wt % at 450° C., or at most 12.5 wt % at 500° C., or at most 30 wt % at 550° C., as measured according to the Mass Loss Test.

Embodiment 22. The polymer material of any one of embodiments 20 and 21, wherein the silicone component is present in polymer material in an amount of at least 6 wt %, or at least 9 wt %, or at least 12.5 wt %, or at least 16 wt %, or at least 20 wt %, based on a total weight of the polymer material.

Embodiment 23. The polymer material of any one of embodiments 20 to 22, wherein the fluorinated component is present in an amount of at most 94 wt %, or at most 91 wt %, or at most 87.5 wt %, or at most 84 wt %, or at most 80 wt %, based on a total weight of the polymer material.

Embodiment 24. An article comprising a single layer, the single layer comprising the polymer material of any one of embodiments 20 to 23.

Embodiment 25. An article comprising a plurality of layers, at least one layer comprising the polymer material of any one of embodiments 20 to 23.

Embodiment 26. The article of any one of embodiments 24 and 25, wherein the article is free of a reinforcement layer.

Embodiment 27. The article of embodiment 25, wherein at least one of the layers comprises a reinforcement layer.

Embodiment 28. The article of embodiment 27, wherein the layer comprising the polymer material directly contacts the reinforcement layer.

Embodiment 29. The article of any one of embodiments 27 and 28, wherein the reinforcement layer includes a fabric comprising a plurality of fibers.

Embodiment 30. The article of embodiment 29, wherein the plurality of fibers includes at least one of a glass fiber or an aramid fiber.

Embodiment 31. The article of any one of embodiments 29 and 30, wherein the polymer material impregnates the plurality of fibers.

Embodiment 32. The article of any one of embodiments 25 to 31, wherein the article includes a second polymer layer overlying the layer comprising the polymer material.

Embodiment 33. The article of embodiment 32, wherein the second polymer layer is disposed between the reinforcement layer and the layer comprising the polymer material.

Embodiment 34. The article of embodiment 32, wherein the layer comprising the polymer material is disposed between the reinforcement layer and the second polymer layer.

Embodiment 35. The article of any one of embodiments 32 to 34, wherein the second polymer layer includes a fluoropolymer.

Embodiment 36. The article of any one of embodiments 32 to 35, wherein the second polymer layer is free of a silicone.

Embodiment 37. A method of making a polymer material, comprising:
providing a dispersion comprising a fluorinated component;
providing an emulsion comprising a reactive silicone component;
mixing the dispersion and the emulsion to form a composition; and
drying the composition to form the polymer material.

Embodiment 38. The method of embodiment 37, further comprising coating the composition on a carrier layer to form a layer.

Embodiment 39. The method of any one of embodiments 37 and 38, wherein the composition includes the composition of any one of embodiments 1 to 19.

Embodiment 40. The method of any one of embodiments 37 to 39, further comprising partially sintering at least one pass to provide a semifused layer.

Embodiment 41. The method of any one of embodiments 37 to 40, further comprising sintering the polymer material to form a sintered polymer material.

Embodiment 42. The method of embodiment 41, wherein a sintering temperature is at least 320° C., or at least 350° C., or at least 360° C., or at least 370° C., or at least 380° C.

Embodiment 43. The method of embodiment 42, wherein the sintered polymer material includes a silicone component derived from the reactive silicone component.

Embodiment 44. The composition, article, or method of any one of the preceding embodiments, wherein the composition or polymer material further comprises a nanoparticulate silicone, an alumina, or a silica.

Embodiment 45. A composition comprising: a dispersion comprising a fluoropolymer component; and an emulsion comprising a silicone component; wherein the fluoropolymer component comprises a plurality of fluoropolymer particles having an average particle diameter D, and wherein a single pass film formed from the composition has a critical crack thickness CCT of at least $1.25 \times 10^{-5} \times D^{2.5}$, where CCT is in microns and D is in nanometers.

Embodiment 46. The composition of embodiment 45, wherein D is at most 400 nm, or at most 380 nm, or at most 360 nm, or at most 300 nm.

Embodiment 47. The composition of any one of the preceding embodiments, wherein D is at least 150 nm, or at least 200 nm, or at least 240 nm.

Embodiment 48. The composition of any one of the preceding embodiments, wherein D is in a range of 150 to 400 nm, or in a range of 180 to 300 nm.

Embodiment 49. The composition of any one of embodiments 45 to 48, wherein CCT is at least 25 microns, or at least 30 microns, or at least 40 microns, or at least 50 microns.

Embodiment 50. The composition of any one of embodiments 45 to 48, wherein CCT is at most 100 microns, or at most 90 microns, or at most 80 microns.

Embodiment 51. The composition of any one of the preceding embodiments, wherein the reactive silicone component comprises a siloxane.

Embodiment 52. The composition of embodiment 51, wherein the siloxane comprises a polydimethylsiloxane.

Embodiment 53. The composition of any one of the preceding embodiments, wherein the reactive silicone component comprises a silicone polymer having one or more functional terminal groups suitable for crosslinking.

Embodiment 54. The composition of embodiment 53, wherein the one or more functional terminal groups includes a hydroxyl, an alkysiloxane, a vinyl, an amino, a methoxy, a methacryl, a polyether, a silanol, a carboxylic anhydride, or any combination thereof.

Embodiment 55. The composition of any one of the preceding embodiments, wherein the reactive silicone component includes a silicone polymer having groups in a polymer backbone other than a methyl group.

Embodiment 56. The composition of embodiment 55, wherein the groups other than a methyl group include a phenyl, a methoxy, an ethoxy, a mercapto, a carboxyl, an acrylate, an isocyanate, an acid anhydride, a polyether, an aralkyl, a fluoroalkyl, or any combination thereof.

Embodiment 57. The composition of any one of the preceding embodiments, wherein the reactive silicone component of the single pass film is at least 6 wt %, or at least 9 wt %, or at least 12.5 wt %, or at least 16 wt %, or at least 20 wt %, based on a total weight of the single pass film.

Embodiment 58. The composition of any one of the preceding embodiments, wherein the fluorinated component includes a fluoropolymer or even a perfluoropolymer.

Embodiment 59. The composition of embodiment 58, wherein the fluoropolymer includes a polytetrafluoroethylene (PTFE), a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), a polychlorotrifluoroethylene (PCTFE), a poly vinylidene fluoride (PVDF), a terpolymer including tetrafluoroethylene, hexafluoropropylene, and vinylidenefluoride (THV), or any blend or any alloy thereof.

Embodiment 60. The composition of any one of the preceding embodiments, wherein the fluorinated component is present in the single pass film in an amount of at most 94 wt %, or at most 91 wt %, or at most 87.5 wt %, or at most 84 wt %, or at most 80 wt %, based on the total weight of the single pass film.

Embodiment 61. The composition of any one of the preceding embodiments, further comprising a filler selected from the group consisting of a pigment, a surfactant, or an antifoam.

Embodiment 62. The composition of embodiment 61, wherein the filler is present in an amount of at most 40 wt %, or at most 30 wt %, or at most 20 wt %, or at most 10 wt %.

Embodiment 63. The composition of any one of embodiments 17 and 18, wherein the filler is present in an amount of at least 0.1 wt %, or at least 1 wt %, or at least 3 wt %, or at least 5 wt %.

Embodiment 64. A polymer material formed from the composition of any one of the preceding embodiments.

Embodiment 65. A polymer material comprising a fluorinated component and a silicone component, wherein the polymer material has a mass loss of at most 5 wt % at 450° C., or at most 12.5 wt % at 500° C., or at most 30 wt % at 550° C., as measured according to the Mass Loss Test.

Embodiment 66. The polymer material of any one of embodiments 64 and 65, wherein the silicone component is present in polymer material in an amount of at least 6 wt %, or at least 9 wt %, or at least 12.5 wt %, or at least 16 wt %, or at least 20 wt %, based on a total weight of the polymer material.

Embodiment 67. The polymer material of any one of embodiments 64 to 65, wherein the fluorinated component is present in an amount of at most 94 wt %, or at most 91 wt %, or at most 87.5 wt %, or at most 84 wt %, or at most 80 wt %, based on a total weight of the polymer material.

Embodiment 68. An article comprising a single layer, the single layer comprising the polymer material of any one of embodiments 64 to 67.

Embodiment 69. An article comprising a plurality of layers, at least one layer comprising the polymer material of any one of embodiments 64 to 67.

Embodiment 70. The article of any one of embodiments 68 and 69, wherein the article is free of a reinforcement layer.

Embodiment 71. The article of embodiment 69, wherein at least one of the layers comprises a reinforcement layer.

Embodiment 72. The article of embodiment 71, wherein the layer comprising the polymer material directly contacts the reinforcement layer.

Embodiment 73. The article of any one of embodiments 71 and 72, wherein the reinforcement layer includes a fabric comprising a plurality of fibers.

Embodiment 74. The article of embodiment 73, wherein the plurality of fibers includes at least one of a glass fiber or an aramid fiber.

Embodiment 75. The article of any one of embodiments 73 and 74, wherein the polymer material impregnates the plurality of fibers.

Embodiment 76. The article of any one of embodiments 68 to 75, wherein article includes a second polymer layer overlying the layer comprising the polymer material.

Embodiment 77. The article of embodiment 76, wherein the second polymer layer is disposed between the reinforcement layer and the layer comprising the polymer material.

Embodiment 78. The article of embodiment 76, wherein the layer comprising the polymer material is disposed between the reinforcement layer and the second polymer layer.

Embodiment 79. The article of any one of embodiments 76 to 78, wherein the second polymer layer includes a fluoropolymer.

Embodiment 80. The article of any one of embodiments 76 to 79, wherein the second polymer layer is free of a silicone.

Embodiment 81. A method of making a polymer material, comprising: providing a dispersion comprising a fluorinated component; providing an emulsion comprising a silicone component; mixing the dispersion and the emulsion to form a composition; and drying the composition to form the polymer material.

Embodiment 82. The method of embodiment 81, further comprising coating the composition on a carrier layer to form a layer.

Embodiment 83. The method of any one of embodiments 81 and 82, wherein the composition includes the composition of any one of embodiments 45 to 63.

Embodiment 84. The method of any one of embodiments 81 to 83, further comprising partially sintering at least one pass to provide a semifused layer.

Embodiment 85. The method of any one of embodiments 81 to 84, further comprising sintering the polymer material to form a sintered polymer material.

Embodiment 86. The method of embodiment 85, wherein a sintering temperature is at least 320° C., or at least 350° C., or at least 360° C., or at least 370° C., or at least 380° C.

Embodiment 87. The method of embodiment 86, wherein the sintered polymer material includes a silicone component derived from the reactive silicone component.

Embodiment 88. The composition, article, or method of any one of the preceding embodiments, wherein the composition or polymer material further comprises a nanoparticulate silicone, an alumina, or a silica.

Embodiment 89. A composition comprising: a dispersion comprising a fluoropolymer component; and an emulsion comprising a silicone component; wherein the fluoropolymer component comprises a plurality of fluoropolymer particles having an average particle diameter D, and wherein a single pass film formed from the composition has a critical crack thickness and wherein the composition comprises an average coating adhesion of at least about 1.5 lbs. when measured according to the Coating Adhesion Test.

Embodiment 90. A composition comprising: a dispersion comprising a fluoropolymer component; and an emulsion comprising a reactive silicone component; wherein the fluoropolymer component comprises a plurality of fluoropolymer particles having an average particle diameter D, and wherein a single pass film formed from the composition has a critical crack thickness and wherein the composition comprises an average coating adhesion of at least about 1.5 lbs. when measured according to the Coating Adhesion Test.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

The invention claimed is:

1. A composition comprising:
a dispersion comprising a fluoropolymer component;
an emulsion comprising a silicone component; and
rigid particles having a Young's Modulus greater than that of particles of the silicone component,
wherein the rigid particles comprise a fluoropolymer, an alumina, a nanoparticulate silicone, or an combination thereof,
wherein the rigid particles have a diameter in a range of 10 nm to 150 nm,
wherein the fluoropolymer component comprises a plurality of fluoropolymer particles having an average particle diameter D,
wherein D is at most 300 nm and at least 150 nm, and
wherein a single pass film formed from the composition has a critical crack thickness (CCT) of at least $1.25 \times 10^{-5} \times D^{2.5}$, where CCT is in microns and D is in nanometers.

2. The composition of claim 1, wherein the silicone component comprises a polydimethylsiloxane.

3. The composition of claim 1, wherein the silicone component comprises a silicone polymer having one or more functional terminal groups suitable for crosslinking.

4. The composition of claim 3, wherein the one or more functional terminal groups includes a hydroxyl, an alkylsiloxane, a vinyl, an amino, a methoxy, a methacryl, a polyether, a silanol, a carboxylic anhydride, or any combination thereof.

5. The composition of claim 1, wherein the reactive silicone component includes a silicone polymer having groups in a polymer backbone other than a methyl group.

6. The composition of claim 5, wherein the groups other than a methyl group include a phenyl, a methoxy, an ethoxy, a mercapto, a carboxyl, an acrylate, an isocyanate, an acid anhydride, a polyether, an aralkyl, a fluoroalkyl, or any combination thereof.

7. The composition of claim 1, wherein the reactive silicone component of the single pass film is at least 6 wt % based on a total weight of the single pass film.

8. The composition of claim 1, wherein the fluorinated component includes a fluoropolymer.

9. The composition of claim 8, wherein the fluoropolymer includes a polytetrafluoroethylene (PTFE), a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), a polychlorotrifluoroethylene (PCTFE), a poly vinylidene fluoride (PVDF), a terpolymer including tetrafluoroethylene, hexafluoropropylene, and vinylidenefluoride (THV), or any blend thereof.

10. A composition comprising:
a dispersion comprising a fluoropolymer component;
an emulsion comprising a reactive silicone component; and
rigid particles having a Young's Modulus greater than that of particles of the silicone component,
wherein the rigid particles comprise a fluoropolymer, an alumina, a nanoparticulate silicone, or any combination thereof,
wherein the rigid particles have a diameter in a range of 10 nm to 150 nm,
wherein the fluoropolymer component comprises a plurality of fluoropolymer particles having an average particle diameter D,
wherein D is at most 300 nm and at least 150 nm, and
wherein a single pass film formed from the composition has a critical crack thickness (CCT) of at least $1.25 \times 10^{-5} \times D^{2.5}$, where CCT is in microns and D is in nanometers.

11. The composition of claim 10, wherein the composition comprises an average coating adhesion of at least about 1.5 lbs. when measured according to a Coating Adhesion Test.

12. The composition of claim 10, wherein the silicone component comprises a polydimethylsiloxane.

13. The composition of claim 10, wherein the silicone component comprises a silicone polymer having one or more functional terminal groups suitable for crosslinking.

14. A method of making a polymer material, comprising:
providing a dispersion comprising a fluorinated component;
providing an emulsion comprising a reactive silicone component;
providing rigid particles having a Young's Modulus greater than that of particles of the silicone component,
mixing the dispersion, the emulsion and the rigid particles to form a composition; and
drying the composition to form the polymer material,
wherein the rigid particles comprise a fluoropolymer, an alumina, a nanoparticulate silicone, or any combination thereof,
wherein the rigid particles have a diameter in a range of 10 nm to 150 nm, and
wherein the fluoropolymer component comprises a plurality of fluoropolymer particles having an average particle diameter D,
wherein D is at most 300 nm and at least 150 nm.

* * * * *